US010768404B2

(12) United States Patent
Harsila (10) Patent No.: US 10,768,404 B2
(45) Date of Patent: Sep. 8, 2020

(54) MODULATION MONITORING SYSTEM FOR USE WITH AN IMAGING SYSTEM THAT INCLUDES A HIGH SPEED PERIODICALLY MODULATED VARIABLE FOCAL LENGTH LENS

(71) Applicant: Mitutoyo Corporation, Kanagawa-ken (JP)

(72) Inventor: Scott Allen Harsila, Shoreline, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 326 days.

(21) Appl. No.: 15/466,272

(22) Filed: Mar. 22, 2017

(65) Prior Publication Data
US 2018/0275390 A1 Sep. 27, 2018

(51) Int. Cl.
G02B 21/24 (2006.01)
G02F 1/33 (2006.01)
G02F 1/29 (2006.01)

(52) U.S. Cl.
CPC .............. G02B 21/245 (2013.01); G02F 1/33 (2013.01); G02F 2001/294 (2013.01)

(58) Field of Classification Search
CPC .... G02B 21/245; G02F 1/33; G02F 2001/294
See application file for complete search history.

(56) References Cited

U.S. PATENT DOCUMENTS 4,518,253 A * 5/1985 Takahashi ............... G01S 17/08
  250/214 B
7,324,682 B2   1/2008 Wasserman
7,454,053 B2  11/2008 Bryll et al.
(Continued)

FOREIGN PATENT DOCUMENTS

CN   104765128 A   7/2015
CN   106338809 A   1/2017

OTHER PUBLICATIONS

Mitutoyo Corporation et al., "QVPAK® 3D CNC Vision Measuring Machine: User's Guide," Version 7, Jan. 2003, 330 pages.
(Continued)

Primary Examiner — Georgia Y Epps
Assistant Examiner — Don J Williams
(74) Attorney, Agent, or Firm — Seed IP Law Group LLP (57) ABSTRACT

A modulation monitoring system is disclosed for use with an imaging system that includes a variable focal length (VFL) lens, an objective lens, a camera, and a VFL lens controller which is configured to control the VFL lens to periodically modulate its optical power and thereby periodically modulate a focus position of the imaging system over a plurality of Z heights along a Z height direction. The modulation monitoring system comprises a VFL-traversing light source, comprising a light source configured to provide VFL-traversing light along a modulation monitoring light path through the VFL lens, and a modulation signal determining portion comprising an optical detector configured to receive the VFL-traversing light, and to provide at least one optical detector signal that corresponds to the modulated optical power of the VFL lens. The modulation monitoring portion outputs a least one modulation monitoring signal based on the at least one optical detector signal.

20 Claims, 6 Drawing Sheets

(56) References Cited

U.S. PATENT DOCUMENTS

| | | | |
|---|---|---|---|
| 8,111,905 B2 | 2/2012 | Campbell | |
| 8,111,938 B2 | 2/2012 | Bryll et al. | |
| 8,773,573 B1 * | 7/2014 | Saeedi | G02B 3/0081 |
| | | | 348/340 |
| 2003/0053028 A1 * | 3/2003 | Wirth | A61L 31/048 |
| | | | 351/221 |
| 2014/0368726 A1 | 12/2014 | Gladnick | |
| 2015/0145980 A1 | 5/2015 | Bryll | |
| 2016/0377412 A1 * | 12/2016 | Li | G01B 11/0608 |
| | | | 356/630 |
| 2017/0013185 A1 | 1/2017 | Gladnick | |
| 2017/0061601 A1 | 3/2017 | Bryll | |
| 2017/0078532 A1 | 3/2017 | Bryll et al. | |

OTHER PUBLICATIONS

Bryll, "Multi-Level Image Focus Using a Tunable Lens in a Machine Vision Inspection System," U.S. Appl. No. 14/841,051, filed Aug. 31, 2015, 64 pages.

Bryll et al., "Chromatic Aberration Correction in Imaging System Including Variable Focal Length Lens," U.S. Appl. No. 14/854,624, filed Sep. 15, 2015, 55 pages.

Chinese Office Action, dated Apr. 21, 2020, for Chinese Application No. 201810238876.8, 20 pages. (With English machine translation).

* cited by examiner

MODULATION MONITORING SYSTEM FOR USE WITH AN IMAGING SYSTEM THAT INCLUDES A HIGH SPEED PERIODICALLY MODULATED VARIABLE FOCAL LENGTH LENS

BACKGROUND

Technical Field

This disclosure relates to precision metrology and, more particularly, to machine vision inspection systems and other optical systems in which a variable focal length lens may be utilized to periodically modulate a focus position.

Description of the Related Art

Precision machine vision inspection systems (or "vision systems" for short) may be used for precise measurements of objects and to inspect other object characteristics. Such systems may include a computer, camera, optical system, and a stage that moves to allow workpiece traversal. One exemplary system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of small or large workpieces at various magnifications.

In various applications, it is desirable to perform high speed measurements for high throughput in either stationary or non-stop moving inspection systems. With respect to well-focused inspection images and Z-height measurements (which are generally based on the "best focus" height determination), the inspection image acquisition rate and the rate at which the Z-height measurements can be performed may be limited by the rate of Z-height focus position adjustment or motion speed. Conventional machine vision inspection systems may utilize various types of measurement operations (e.g., points-from-focus operations, etc.) which require movement of the camera through a range of Z-height positions. In confocal systems, movement may similarly be required through a range of Z-height positions (e.g., to determine a position that results in maximum confocal brightness, etc.) In such systems, the speed at which the Z-height measurements can be performed may be limited by the motion of one or more physical components of the systems to provide the range of Z-height positions.

To overcome these motion constraints, variable focus lenses (VFLs), such as innovative electronically deformable lenses and/or tunable acoustic gradient lenses (TAG lenses), are able to be periodically modulated and change focus position at a very high rate (e.g., 70 KHz or more, in the case of a TAG lens). However, variations in conditions such as temperature may give rise to changes in optical power and modulation frequency of VFLs. It is desirable to provide a means to identify such changes in performance, which may require compensation.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein, and particularly with reference to FIGS. 3-6, are combinations of elements, principles and operations that may be used to solve the problems outlined above, in various implementations of a system that that is operable to monitor the modulation characteristics of a high speed periodically modulated VFL lens. The disclosed implementations are particularly advantageous for use in combination with a TAG lens.

In particular, a modulation monitoring system is disclosed for use with an imaging system that includes a high speed periodically modulated variable focal length (VFL) lens. The imaging system comprises an objective lens, a VFL lens controller and a camera. The objective lens is configured to input image light arising from a workpiece surface. The VFL lens is configured to receive image light transmitted by the objective lens along an imaging optical path. The camera is configured to receive light transmitted by the VFL lens along the imaging optical path. The VFL lens controller is configured to control the VFL lens to periodically modulate its optical power at high speed and thereby periodically modulate a focus position of the imaging system over a plurality of imaging system focus Z heights along a Z height direction. The modulation monitoring system comprises a VFL-traversing light source, comprising a light source configured to provide VFL-traversing light along a modulation monitoring light path through the VFL lens, and a modulation signal determining portion comprising an optical detector configured to receive the VFL-traversing light, and to provide at least one optical detector signal that corresponds to the modulated optical power of the VFL lens, and the modulation monitoring portion outputs a least one modulation monitoring signal based on the at least one optical detector signal.

DETAILED DESCRIPTION

Figure 1:
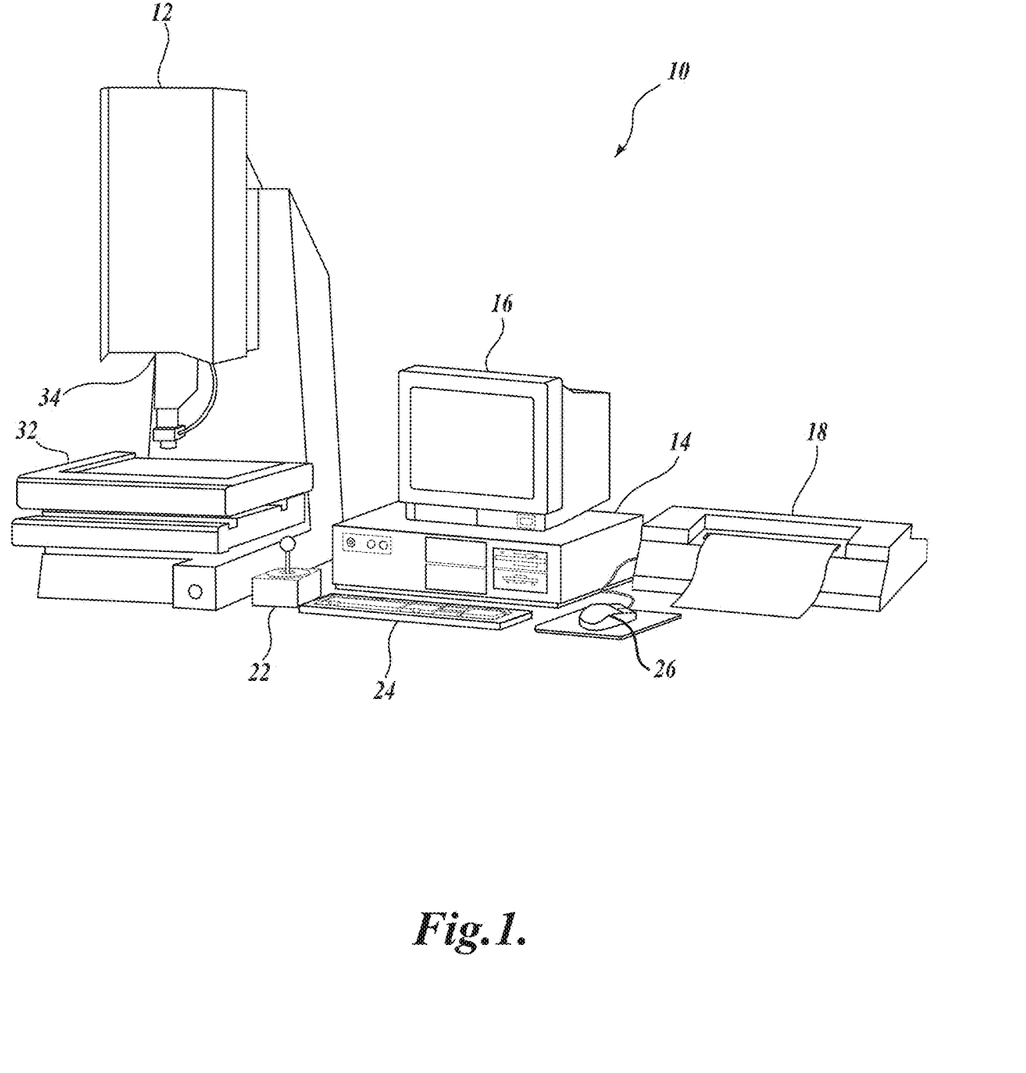
FIG. 1 is a diagram showing various typical components of a general-purpose precision machine vision inspection system.

FIG. 1 is a block diagram of one exemplary machine vision inspection system 10 usable in accordance with principles disclosed herein. The machine vision inspection system 10 includes a vision measuring machine 12 that is operably connected to exchange data and control signals with a controlling computer system 14, and with a monitor or display 16, printer 18, joystick 22, keyboard 24, and mouse 26. The monitor or display 16 may display a user interface suitable for controlling and/or programming the machine vision inspection system 10. In various implementations, a touchscreen tablet or the like may be substituted for and/or redundantly provide the functions of any or all of the computer system 14, display 16, joystick 22, keyboard 24, and mouse 26.

More generally, the controlling computer system 14 may comprise or consist of any computing system or device, and/or distributed computing environment, and the like, any of which may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications (e.g., 0.5× to 100×) for the images provided by the optical imaging system 34. Similar machine vision inspection systems are described in commonly assigned U.S. Pat. Nos. 7,324,682; 7,454,053; 8,111,905; and 8,111,938, each of which is hereby incorporated herein by reference in its entirety.

Figure 2:
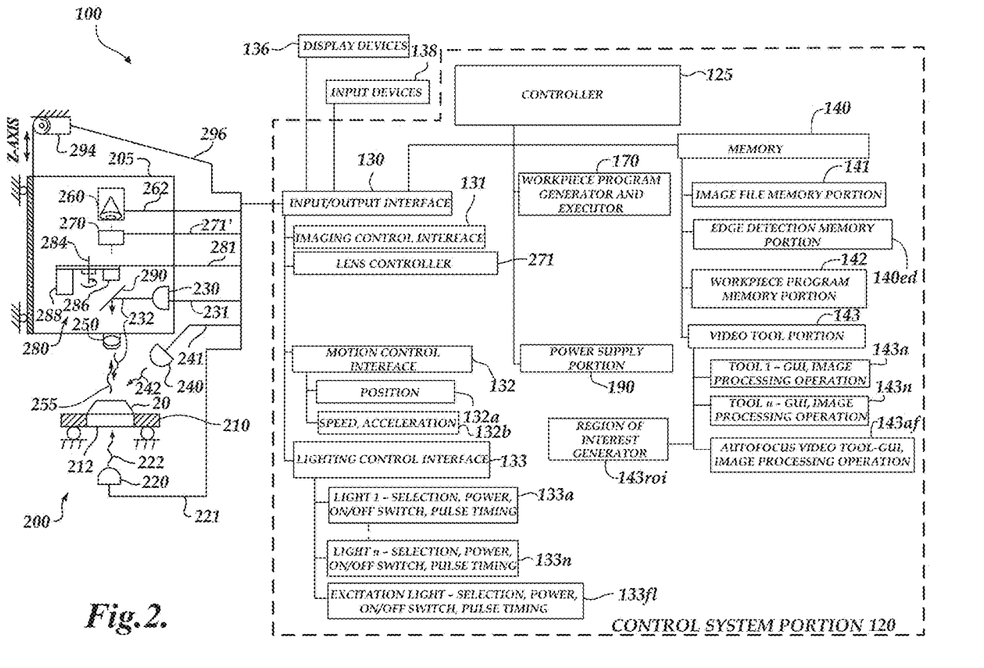
FIG. 2 is a block diagram of a control system portion and a vision components portion of a machine vision inspection system similar to that of FIG. 1 and includes features disclosed herein.

FIG. 2 is a block diagram of a control system portion 120 and a vision components portion 200 of a machine vision inspection system 100 similar to the machine vision inspection system of FIG. 1, and includes features as described herein. As will be described in more detail below, the control system portion 120 is utilized to control the vision components portion 200. The vision components portion 200 includes an optical assembly portion 205, light sources 220, 230, and 240, and a workpiece stage 210 that may have a central transparent portion 212. The workpiece stage 210 is controllably movable along x- and y-axes that lie in a plane that is generally parallel to the surface of the stage where a workpiece 20 may be positioned.

The optical assembly portion 205 may include a camera 260, a variable focal length (VFL) lens 270, and may also include an interchangeable objective lens 250 and a turret lens assembly 280 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses (e.g., a set ranging from 0.5× to 100×, etc.).

In various implementations, the optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. As will be described in more detail below, the VFL lens 270 may also be operated to periodically modulate a focus position. A workpiece 20, or a tray or fixture holding a plurality of workpieces 20, which is to be imaged using the machine vision inspection system 100 is placed on the workpiece stage 210. In various implementations, the workpiece stage 210 may be controllable to move (e.g., in the x- and y-axes directions) relative to the optical assembly portion 205, such that the imaged area (e.g., as imaged through the interchangeable objective lens 250, etc.) moves between locations on a workpiece 20, and/or among a plurality of workpieces 20.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light (e.g., as used for imaging) passes through the interchangeable objective lens 250, the turret lens assembly 280, and the VFL lens 270, and is gathered by the camera 260. In various implementations, the camera 260 inputs the workpiece light and outputs signal data (e.g., one or more images of the workpiece(s) 20) on a signal line 262 to the control system portion 120. The light sources 220, 230, and 240 may be connected to the control system portion 120 through signal lines or busses 221, 231, and 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, and a lighting control interface 133. The motion control interface 132 may include a position control element 132a, and a speed/acceleration control element 132b, although such elements may be merged and/or indistinguishable. The lighting control interface 133 may include lighting control elements 133a, 133n, and 133fl that control, for example, the selection, power, on/off switch, and strobe pulse timing, if applicable, for the various corresponding light sources of the machine vision inspection system 100.

In accordance with the principles disclosed herein, the input/output interface 130 may further include a lens controller 271, as will be described in more detail below with respect to FIGS. 3-6. Briefly, in one implementation, the lens controller 271 may include a lens controller including a lens focus operating circuit and/or routine, or the like. The lens controller 271 may be configured or controlled by a user and/or an operating program, and may utilize the signal line 271' to control the VFL lens 270 to periodically modulate its optical power (e.g., sinusoidally) and thereby periodically modulate a focus position of the imaging system over a plurality of focus positions along a Z-height direction at a determined operating frequency.

In various implementations, the imaging control interface 131 and/or lens controller 271 may further include an extended depth of field mode, as described in more detail in copending and commonly assigned U.S. Patent Publication No. 2015/0145980, which is hereby incorporated herein by reference in its entirety. An extended depth of field mode may be selected by a user to provide at least one image (e.g., a composite image) of a workpiece with a depth of field that is greater than what may be provided by the vision components portion 200 when focused at a single focus position. In various implementations, the imaging control interface 131 and/or lens controller 271 may also further include a magnification change adjustment mode, which may be selected or automatically implemented when a magnification change is made or detected, as described in more detail in copending and commonly assigned U.S. Patent Publication No. 2017/0013185 (also referred to as the '185 application), entitled "Adaptable Operating Frequency of a Variable Focal Length Lens in an Adjustable Magnification Optical System," which is hereby incorporated herein by reference in its entirety. Other systems and methods including VFL lenses are described in copending and commonly assigned U.S. patent application Ser. No. 14/841,051, entitled "Multi-Level Image Focus Using a Tunable Lens in a Machine Vision Inspection System," filed on Aug. 31, 2015, and in copending and commonly assigned U.S. patent application Ser. No. 14/854,624, entitled "Chromatic Aberration Correction in Imaging System Including Variable Focal Length Lens", filed on Sep. 15, 2015, each of which is hereby incorporated herein by reference in its entirety.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. The autofocus video tool 143af may additionally include a high-speed focus height tool that may be utilized to measure focus heights with high speed, as described in more detail in copending and commonly assigned U.S. Patent Publication No. 2014/0368726, which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, and 241 of the stage light 220, the coaxial light 230, and the surface light 240, respectively, are all connected to the input/output interface 130. The signal line 262 from the camera 260, the signal line 271' from the VFL lens 270, and the signal line 296 from the controllable motor 294 are connected to the input/output interface 130. In addition to carrying image data, the signal line 262 may carry a signal from the controller 125 that initiates certain processes (e.g., image acquisition, confocal brightness measurement, etc.).

One or more display devices 136 (e.g., the display 16 of FIG. 1) and one or more input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the camera 260, and/or to directly control the vision components portion 200. The display devices 136 may display user interface features (e.g., as associated with the lens controller 271).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one or more of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a current workpiece (e.g., a run mode workpiece), or workpieces, which is similar to the representative workpiece used when creating the part program.

Figure 3:
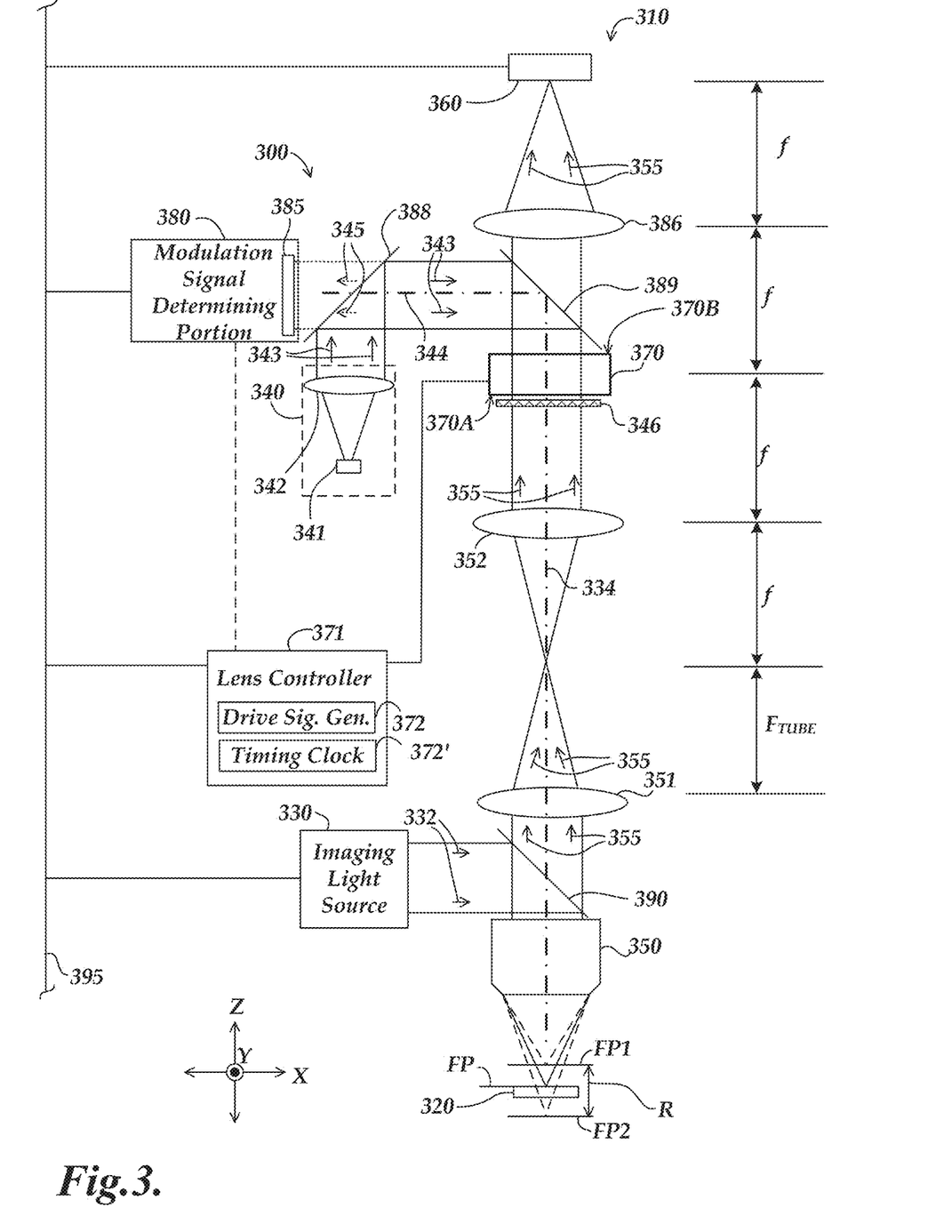
FIG. 3 is a schematic diagram of a first implementation of a modulation monitoring system for use with an imaging system that includes a high speed periodically modulated variable focal length (VFL) lens.

FIG. 3 is a schematic diagram of a first implementation of a modulation monitoring system 300 for use with an imaging system 310 that includes a high speed periodically modulated variable focal length (VFL) lens 370. The imaging system 310 may be adapted to a machine vision inspection system such as the machine vision inspection system 100. The imaging system 310 comprises a light source 330, a tube lens 351, a relay lens 352, an objective lens 350, the VFL lens 370, a camera 360, a relay lens 386, and a VFL lens controller 371. The objective lens 350 is configured to input image light (workpiece light) 355 arising from a workpiece surface 320. The VFL lens 370 is configured to receive the image light 355 transmitted by the objective lens along an imaging optical path 334. The camera 360 is configured to receive image light 355 transmitted by the VFL lens 370 along the imaging optical path 334. The VFL lens controller comprises a drive signal generator 372 and a timing clock 372'. The VFL lens controller 371 is configured to control the VFL lens 370 to periodically modulate its optical power at high speed and thereby periodically modulate a focus position FP of the imaging system 310 over a plurality of imaging system focus Z heights along a Z height direction.

In various implementations, the light source 330 is configurable to illuminate the workpiece surface 320 (e.g., with strobed or continuous-wave illumination) in a field of view of the imaging system 310. In various implementations, the light source 330 may include first, second, third, etc., sources of illumination as part of an illumination system. For example, the light source 330 may be operated to provide an instance of strobed illumination by operating a corresponding source of illumination (e.g., a source of illumination that is part of the light source 330). In various implementations, in order to achieve proper lighting balance, the light source 330 may be controllable so as to allow for independent adjustment of the intensity of all instances of strobed illumination (e.g., each corresponding to a different source of illumination within the light source 330) as well as simultaneous adjustment to control an overall brightness of an image.

In operation, in the implementation shown in FIG. 3, the light source 330 is a "coaxial" light source configured to emit source light 332 along a path including a partial mirror 390 and through the objective lens 350 to a surface of a workpiece 320, wherein the objective lens 350 receives workpiece light (image light) 355 that is focused at the focus position FP proximate to the workpiece 320, and outputs the workpiece light 355 to the tube lens 351. In other implementations, analogous light sources may illuminate the field of view in a non-coaxial manner, for example a ring light source may illuminate the field of view. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the relay lens 352.

The relay lens 352 receives the workpiece light 355 and outputs it to the VFL lens 370. The VFL lens 370 receives the workpiece light 355 and outputs it to the relay lens 386. The relay lens 386 receives the workpiece light 355 and outputs it to the camera 360. In various implementations, the camera 360 may capture an image of the workpiece 320 during an image exposure period, and may provide the image to a control system portion (e.g., similar to the operation of the camera 260 for providing an image to the control system portion 120 in FIG. 2).

In the example of FIG. 3, the relay lenses 352 and 386 and the VFL lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance $F_{TUBE}$ of the tube lens 351 is illustrated as being approximately equidistant to a midpoint between the lenses 351 and 352, as is a focal distance f of the relay lens 352. In alternative implementations, the focal distance $F_{TUBE}$ for the tube lens 351 may be made to be different than the focal distance f of the relay lens 352 (which corresponds to one of the 4 f's of the 4f optical configuration). In various implementations where the tube lens 351 may be included as part of a turret lens assembly, it may be desirable for other tube lenses of the turret lens assembly, when rotated into the operational position, to have a focal point at the same location (i.e., so as to meet the focal point of the relay lens 352).

As described in more detail in the previously incorporated '185 application, the ratio of the focal distance $F_{TUBE}$ to the focal distance f can be utilized to alter the diameter of the collimated beam of workpiece light 355 out of the relay lens 352 relative to the collimated beam of the workpiece light 355 that is input to the tube lens 351. It will be appreciated with respect to the collimated beams of workpiece light 355 that are respectively input to the tube lens 351 and output from the relay lens 352, that in various implementations such collimated beams may be extended into longer path lengths and/or beam splitters may be utilized with respect to such collimated beams for providing additional optical paths (e.g., as directed to different camera systems, etc.)

In various implementations, the illustrated 4f optical configuration permits placing the VFL lens 370 (e.g., which may be a low numerical aperture (NA) device, such as a tunable acoustic gradient index of refraction lens), at the Fourier plane of the objective lens 350. This configuration may maintain the telecentricity at the workpiece 320 and may minimize scale change and image distortion (e.g., including providing constant magnification for each Z-height of the workpiece 320 and/or focus position FP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL lens, so as to minimize image aberrations, etc.

It will be appreciated that in various implementations, certain types of dimensional measurements may require near-diffraction or diffraction-limited imaging. The configuration illustrated in FIG. 3 reduces aberrations by restricting the off-axis extent of the pupil of the objective lens 350 that is imaged into the VFL lens 370. In this configuration, the radial extent may be maintained to be less than the radial extent of the first Bessel ring in the refractive index profile of the standing wave of the VFL lens 370 (e.g., a tunable acoustic gradient index of refraction lens) at its lowest resonant frequency $f_{R,MIN}$, as described in more detail in the previously incorporated '185 application. In this manner, light from the microscope configuration (i.e., including the objective lens 350 and the tube lens 351) does not exceed the largest clear aperture $CA_{VFL,MAX}$ of the VFL lens 370. In an implementation where the light did exceed the largest clear aperture, the light could interact with the region of the standing wave of the VFL lens 370 that may have an undesirable refractive index which could increase aberrations and reduce dimensional measurement precision.

The VFL lens 370 is electronically controllable to vary the focus position FP of the imaging system (e.g., during one or more image exposures, during a confocal brightness determination, etc.). The focus position FP may be moved within a range R bound by a focus position FP1 and a focus position FP2. It will be appreciated that in various implementations, the range R may be selected by a user or may result from design parameters or may otherwise be automatically determined. In general with respect to the example of FIG. 3, it will be appreciated that certain of the illustrated dimensions may not be to scale. For example, the VFL lens 370 may have different proportional dimensions than those illustrated (e.g., may be less wide and up to 50 mm long or longer for certain applications in order to provide a desired amount of lensing power, etc.).

The modulation monitoring system 300 comprises a VFL-traversing light source 340, a modulation signal determining portion 380, a beamsplitter 388, a beamsplitter 389, and a wavelength dependent reflector 346. The VFL-traversing light source 340 comprises a light generator 341 configured to provide VFL-traversing light 343 along a modulation monitoring light path 344 through the VFL lens 370. The modulation signal determining portion 380 comprises an optical detector 385 which is configured to receive the reflected VFL-traversing light 345, and to provide at least one optical detector signal that corresponds to the modulated optical power of the VFL lens 370, and the modulation monitoring system 300 outputs a least one modulation monitoring signal based on the at least one optical detector signal.

In various implementations, each of the lens controller 371 and the modulation signal determining portion 380, as well as additional components, may be interconnected by one or more data/control busses (e.g., a system signal and control bus 395) and/or application programming interfaces, or by direct connections between the various elements.

In the implementation shown in FIG. 3, the VFL-traversing light source 340 is arranged to provide the VFL-traversing light 343 along a modulation monitoring light path 344 which inputs the VFL-traversing light 343 at a back portion 370B of the VFL lens 370 which is farther from the objective lens 350. The wavelength dependent reflector 346 is arranged to reflect the VFL-traversing light 343 back along the modulation monitoring light path 344 (denoted as reflected VFL-traversing light 345) after it is output from the VFL lens 370 at a front portion 370A of the VFL lens 370 which is closer to the objective lens 350. The optical detector 385 is arranged to receive reflected VFL-traversing light 345 along the modulation monitoring light path 344 after it is output from the VFL lens 370 at the back portion 370B and reflected by the beamsplitter 389 and the beamsplitter 388.

In some implementations, the wavelength dependent reflector 346 may be a dichroic or narrow band reflector, and the beamsplitter 389 may comprise a beamsplitting surface which is a dichroic or narrow band reflector. In some implementations, it may be desirable for the light generator 341 to output VFL-traversing light 343 which is outside of a spectrum of light to which the camera 360 is sensitive, in order to avoid any unwanted VFL-traversing light 343 being imaged by the camera 360. For example, the VFL-traversing light may have a wavelength which is at least 700 nm. The wavelength dependent reflector 346 and the beamsplitter 389 may then be configured to transmit the image light 355 and reflect the VFL-traversing light 343 and/or reflected VFL-traversing light 345.

In the implementation shown in FIG. 3, the VFL-traversing light source 340 comprises a light generator 341 (e.g., one or more LED's or laser diodes), and a collimating lens 342. In various implementations the VFL-projected light 343 may be collimated as it is projected along the modulation monitoring light path 344.

Various alternative implementations may incorporate optical components analogous to the modulation monitoring system 300, but in a different order relative to the VFL lens 370 and the objective lens 350. In some implementations, including but not limited to those described in greater detail below with reference to FIG. 4 and/or FIG. 5, a VFL-traversing light source 340 may be arranged to provide VFL-traversing light along a modulation monitoring light path which inputs the VFL-traversing light at the front portion 370A of the VFL lens 370 which is closer to the objective lens 350. A wavelength dependent reflector may be arranged to reflect the VFL-traversing light along the modulation monitoring light path after it is output from the VFL lens 370 at the back portion 370B of the VFL lens 370 which is farther from to the objective lens 350. An optical detector may be arranged to receive reflected VFL-traversing light along the modulation monitoring light path after it is output from the VFL lens 370 at the front portion 370A.

In some implementations, the modulation monitoring system 300 may be configured to output the at least one optical signal as feedback to the VFL lens controller 371 to compensate for changes in at least one of optical power or frequency of the VFL lens 370, which may result from changes in ambient conditions such as temperature, or other factors. For example, the drive signal generator 372 may adjust a drive signal which drives the modulation of the VFL lens 370 in response to the at least one optical detector signal. In some implementations, the modulation monitoring system 300 may provide feedback through the system signal and control bus 395 or, alternatively, through a direct connection indicated by a dashed line in FIG. 3.

In some implementations, the VFL-traversing light source 340 may be configured to strobe the VFL-traversing light 343 such that strobe pulses correspond to various phases of modulation of the VFL lens 370. The modulation of the VFL lens 370 may be sampled at desired timing by the optical detector 385 in order to determine factors such as amplitude and frequency that characterize the modulation.

Figure 4:
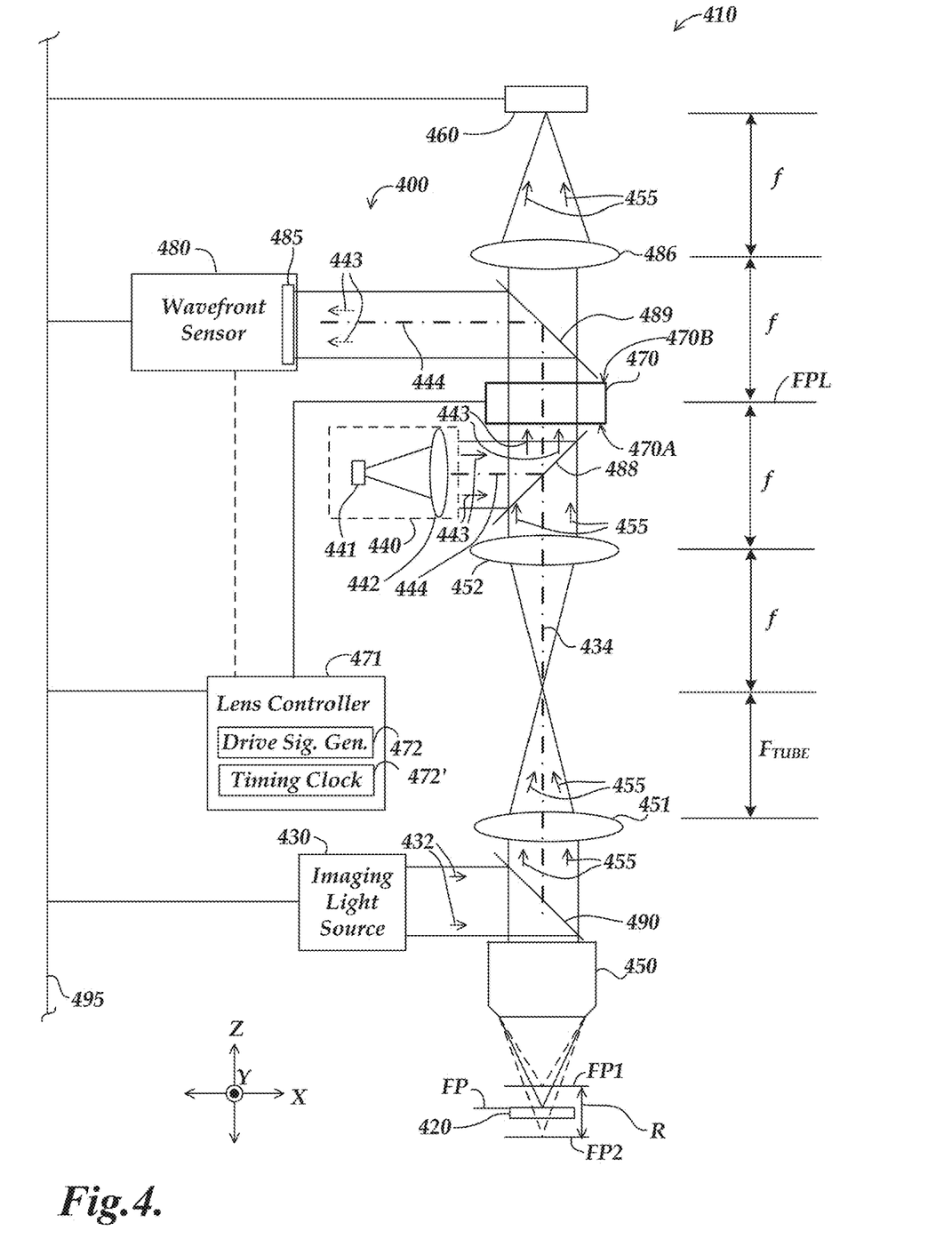
FIG. 4 is a schematic diagram of a second implementation of a modulation monitoring system for use with an imaging system that includes a high speed periodically modulated variable focal length (VFL) lens.

FIG. 4 is a schematic diagram of a second implementation of a modulation monitoring system 400 for use with an imaging system 410 that includes a high speed periodically modulated variable focal length (VFL) lens 470. It will be appreciated that the modulation monitoring system 400 of FIG. 4 shares several characteristics with the modulation monitoring system 300 of FIG. 3, and may be understood, in large part, by analogy based on the previous description. Certain numbered components of FIG. 4 may correspond to and/or have similar operations as similarly numbered components of FIG. 3, except as otherwise described below. Therefore, such similar components and shared characteristics will not be described in detail. The following description emphasizes certain elements and aspects of operation of the system 400 that are different in comparison to various system implementations previously described herein.

In the implementation shown in FIG. 4, a VFL-traversing light source 440 is arranged to provide VFL-traversing light 443 along a modulation monitoring light path 444 which inputs the VFL-traversing light 443 at a front portion 470A of a VFL lens 470 which is closer to an objective lens 450. An optical detector 485 is arranged to receive the VFL-traversing light 443 along the modulation monitoring light path 444 after it is output from the VFL lens 470 at the back portion 470B.

In the particular implementation illustrated in FIG. 4, a light generator 441 outputs VFL-traversing light 443 which is reflected from a beamsplitter 488 and selectively reflected from a beamsplitter 489 in order to separate the VFL-traversing light 443 from image light 455. By analogy with operation and design outlined above with reference to FIG. 3, in various embodiments it may desirable that the light generator 441 output VFL-traversing light 443 which is outside of a spectrum of light to which a camera 460 is sensitive, and the beamsplitter 488 and the beamsplitter 489 may comprise a surface which is a dichroic or narrow band reflector which transmits all or most of the image light 455 and reflects all or most of the VFL-traversing light 443.

Various alternative implementations may incorporate optical components analogous to the modulation monitoring system 400, but in a different order relative to the VFL lens 470 and the objective lens 450. In some implementations, a VFL-traversing light source may be arranged to provide VFL-traversing light along a modulation monitoring light path which inputs the VFL-traversing light at a back portion 470B of the VFL lens 470 which is farther from the objective lens 450. An optical detector may be arranged to receive the VFL-traversing light along the modulation monitoring light path after it is output from the VFL lens 470 at the front portion 470A.

Figure 5:
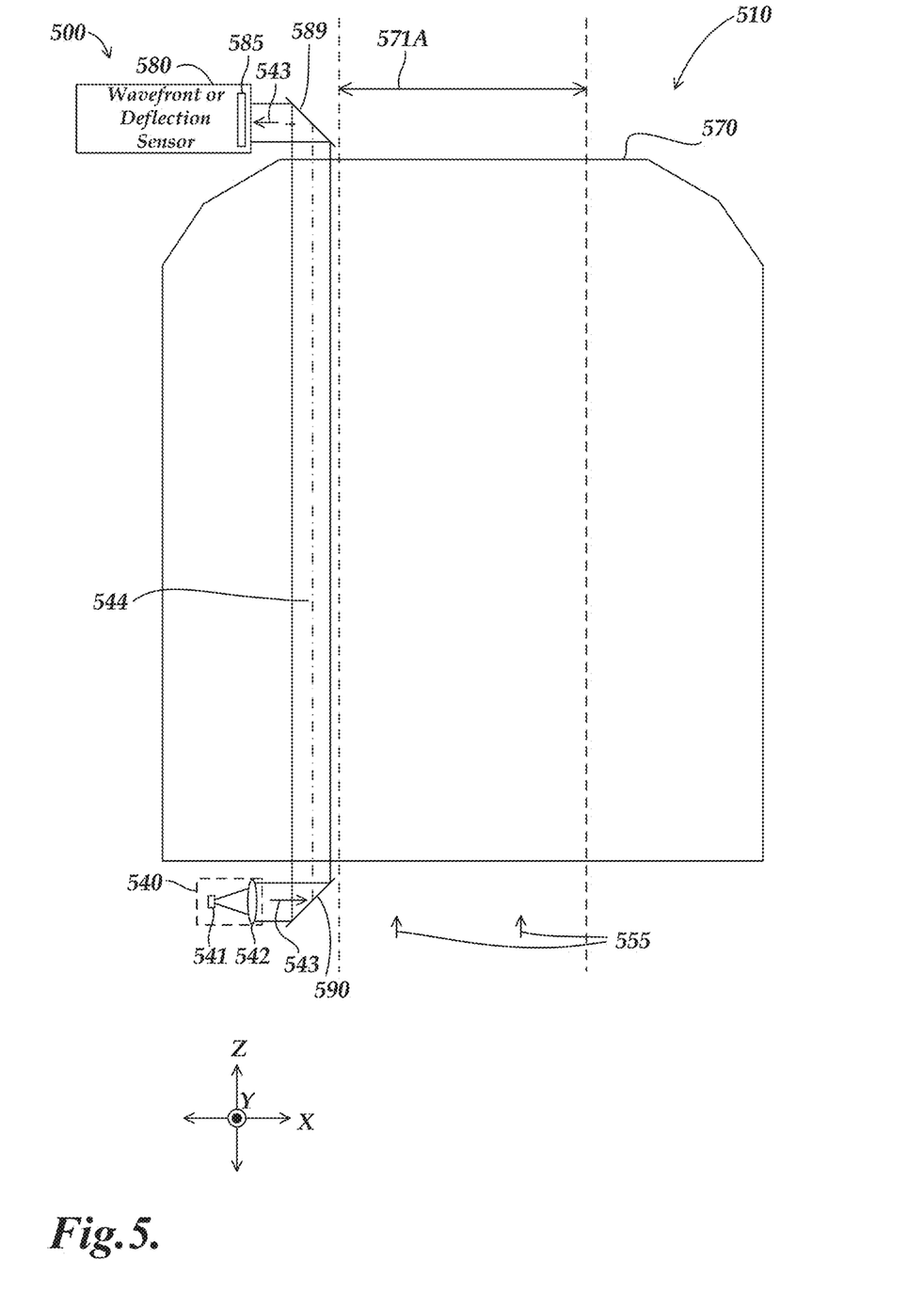
FIG. 5 is a schematic diagram of a third implementation of a modulation monitoring system for use with an imaging system that includes a high speed periodically modulated variable focal length (VFL) lens.

FIG. 5 is a schematic diagram of a third implementation of a modulation monitoring system 500 for use with an imaging system 510 that includes a high speed periodically modulated variable focal length (VFL) lens 570. For simplicity, only the VFL lens 570 of the imaging system 510 is shown. The VFL lens 570 may be placed in the imaging system 510 in an arrangement similar to the imaging system 410. Certain numbered components of FIG. 5 may correspond to and/or have similar operations as similarly numbered components of FIG. 4, except as otherwise described below. Therefore, such similar components and shared characteristics will not be described in detail. The modulation monitoring system 500 comprises a VFL-traversing light source 540, comprising a light source 541 configured to provide VFL-traversing light 543 along a modulation monitoring light path 544 through the VFL lens 570, and a modulation signal determining portion 580 comprising an optical detector 585 configured to receive the VFL-traversing light 543, and to provide at least one optical detector signal that corresponds to the modulated optical power of the VFL lens 570, and the modulation monitoring system 500 outputs a least one modulation monitoring signal based on the at least one optical detector signal. In the implementation shown in FIG. 5, the modulation monitoring light path 544 passes through the VFL lens 570 outside of portion 571A of the VFL lens that is used for imaging. More specifically, the portion 571A may be understood to correspond to an image aperture for transmitting imaging light 555 to a detector. As previously outline with respect to FIG. 3, for a VFL lens 570 which is a tunable acoustic gradient index lens, the portion 571A should be less than the radial extent of the first Bessel ring in the refractive index profile of the standing wave of the VFL lens 570. In some implementations which are similar to the modulation monitoring system 500, the VFL-traversing light 543 may be a narrow laser beam. The VFL-traversing light 543 may be located outside of the radial extent of the first Bessel ring, e.g., within the radial extent of second Bessel ring. While such a "second Bessel ring" region of the VFL lens 570 may be unsuitable for aberration-free imaging, it may nonetheless be suitable for deflecting or focusing the VFL-traversing light 543 such that a modulation signal determining portion 580 (e.g., a wavefront or beam deflection sensor) can be operated to monitor an amplitude and/or frequency and/or phase of modulation of the VFL lens 570.

It should be appreciated that in the implementation shown in FIG. 5, the modulation monitoring system 500 comprises a reflector 588 and a reflector 589 which serve similar purposes as the beamsplitter 488 and the beamsplitter 489. However, the modulation monitoring system 500 does not require wavelength dependent reflection as the modulation monitoring light path 544 passes through the VFL lens 570 outside of the portion 571A of the VFL lens that is used for imaging and, therefore, it is unnecessary to separate the VFL-traversing light 543 from the imaging light 555. In some implementations which are similar to the modulation monitoring system 500, the reflector 588 and the reflector 589 may even be unnecessary depending on the particular arrangement of the imaging system 510. It will be understood that the arrangement shown in FIG. 5, may be adapted to input the VFL-traversing light 543 at either the front or the back of the VFL lens 570, and sense the modulation of the VFL-traversing light 543 at the other of the back or front of the VFL lens 570.

Figure 6A:
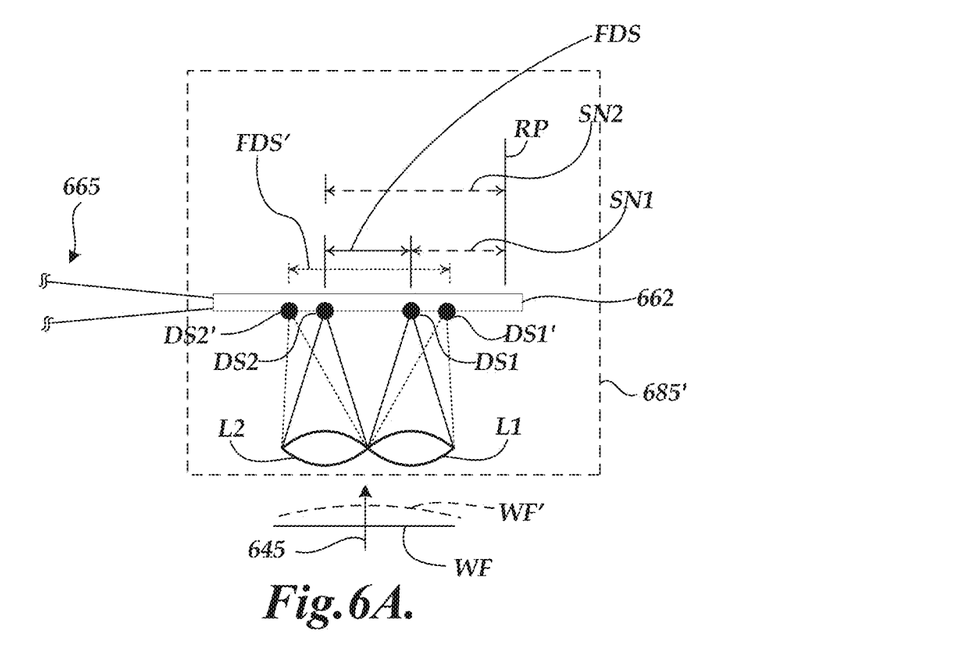
FIGS. 6A and 6B show first and second implementations of "directional" type optical detectors, usable in various implementations of an optical detector.
Figure 6B:
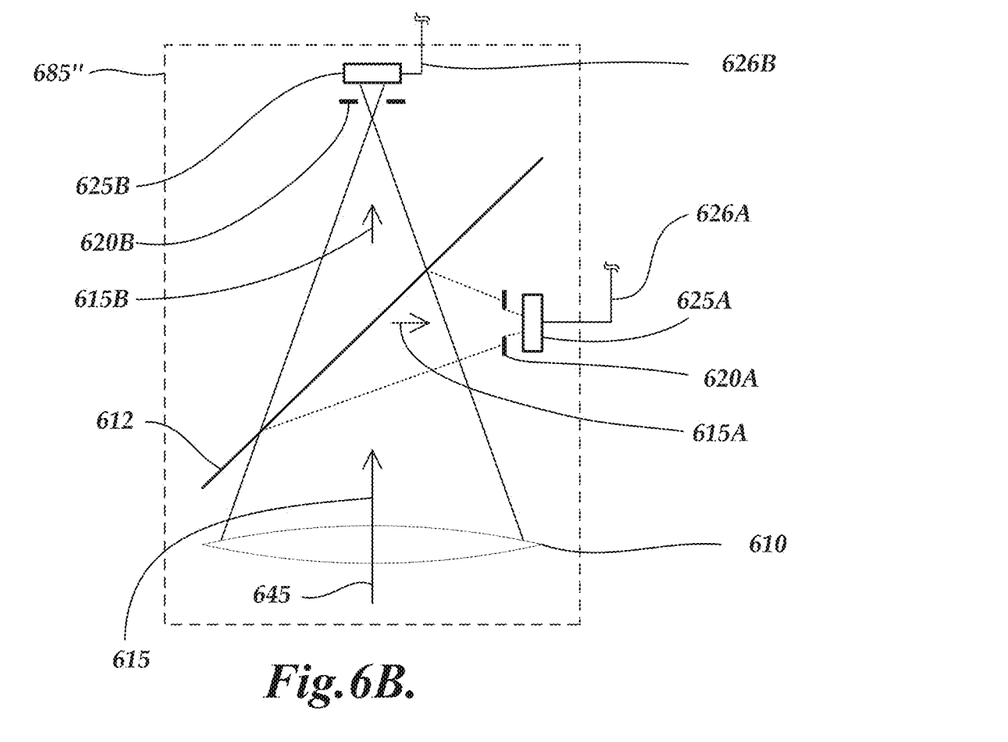

FIGS. 6A and 6B show first and second implementations of "directional" type optical detectors 685' and 685", usable in various implementations of an optical detector such as the optical detectors 385, 485, or 585.

The optical detector 685' comprises a known type of wavefront curvature detector. In general, a wavefront sensor, as the term is used herein, may be described as sampling at least one local ray angle at a corresponding region along a wavefront of an input light beam to provide at least one corresponding detection signal that depends on the sampled local ray angle. Generally, it is desirable to sample at least two respective local ray angles at two respective corresponding regions that are separated along the wavefront of the input light beam, to provide at least two respective detection signals that depend on the sampled local ray angles. A relationship including the at least two detector signals corresponds to a degree of wavefront curvature of input light 645, and the effects of wavefront tilt (as opposed to wavefront curvature) may be detected and rejected as a common mode error that is present in each of the at least two detector signals.

The illustrated optical detector 685' may be characterized as a Shack-Hartmann sensor, and includes lenses L1 and L2 and a detector 662 having signal and control line(s) 665. In one embodiment, the lenses L1 and L2 may be micro-lenses. The lenses L1 and L2 each focus input light (e.g., the reflected VFL-traversing light outlined above with reference to FIG. 3).

In the example shown in FIG. 6, the input light 645 (e.g., the VFL traversing light 345, 443, or 543) has a wavefront schematically represented by the wavefront WF. For the wavefront WF, the lenses L1 and L2 produce images that appear as detection spots DS1 and DS2, respectively, on the detector 662. In one implementation, the detector 662 may comprise at least one quad cell photodiode, e.g., a model S5980 segmented silicon type PIN photodiode manufactured by Hamamatsu Photonics of Shizuoka, Japan. Multiple quad cell photodiodes may provide high resolution wavefront sampling, but in some implementations, a single quad cell photodiode mounted away from a central optical axis of modulation monitoring light path may provide sufficient sampling for monitoring the modulation of a VFL lens. In other implementations, the detector 662 may comprise at least two discrete photodetectors or at least one position sensitive detector. In any case, the detection spots DS1 and DS2 are at distances SN1 and SN2, respectively, from a reference position RP along the surface of the detector 662. The difference between the distances SN1 and SN2 may be regarded as representing a modulation monitoring signal MMS. The reference position RP from which the distances SN1 and SN2 are measured may be arbitrarily selected.

As is known in the art, the "flat" wavefront WF corresponds to input light 645 which is collimated. When the wavefront WF is flat, the detection spots DS1 and DS2 appear at nominal "null" positions aligned with the optical axes of the corresponding individual lenses, and the modulation monitoring signal MMS has a nominal or "null" value.

Throughout various phases of modulation of a VFL lens, the wavefront WF is not flat. In an example shown in FIG. 6, the input light 645 has a wavefront schematically represented by the curved wavefront WF'. For the wavefront WF', the lenses L1 and L2 produce images that appear as detection spots DS1' and DS2', respectively, on the detector 662. For the illustrated polarity of wavefront curvature the detection spots DS1' and DS2' appear at positions that are farther apart than the null positions DS1 and DS2, and a modulation monitoring signal MMS' is greater than its nominal or "null" value. Conversely, for a wavefront (WF") having a curvature of the opposite polarity, the detection spots (DS1" and DS2") would appear at positions that are closer together than the null positions DS1 and DS2, and a modulation monitoring signal MMS" would be less than its nominal or "null" value.

FIG. 6B shows an optical detector 685" comprising a known type of axial focus location sensor, which is a directional type sensor that may include a lens 610, a beamsplitter 612, a first pinhole aperture 620A and a first photodetector 625A, and a second pinhole aperture 620B and a second photodetector 625B. In operation the lens 610 inputs the input light 645 (e.g., the VFL traversing light 345, 443, or 543) and transmits it as a focused light beam 615 toward the beamsplitter 612, which splits it into first and second measurement beams 615A and 615B. As illustrated in FIG. 6B, the first aperture 620A may be placed at a location that has an optical path length to the lens 610 that is slightly less than the nominal focal length of the lens 610, and the second aperture 620B may be located to have a slightly longer optical path length. Thus, as illustrated in FIG. 6B, when the second measurement beam 615B focuses approximately at the second aperture 620B, the second photodetector 625B will receive all of the energy in the second measurement beam 615B and output a second detector signal on a signal line 626B that has a maximum value. At the same time, the focus point of the first measurement beam 615A will be beyond the optical path length to the first aperture 620A. Therefore, the first aperture 620A will occlude a portion of the first measurement beam 615A and the first photodetector 625A will output a first detector signal on a signal line 626A that has a lower value than the second detector signal on the signal line 626B. In general, the difference between the two detector signals will vary in dependence on the axial focus location of the input light 645, which depends on the nominal convergence or divergence of its light rays, which is related to its wave front curvature.

It should be appreciated that the implementations shown herein have primarily related to a modulation monitoring system for use with an imaging system which is part of a machine vision inspection system. Such implementations are exemplary and not limiting. A modulation monitoring system according to the principles disclosed herein may be used with an imaging system in other applications as may be understood by one skilled in the art.

While preferred implementations of the present disclosure have been illustrated and described, numerous variations in the illustrated and described arrangements of features and sequences of operations will be apparent to one skilled in the art based on this disclosure. Various alternative forms and combinations of disclosed elements and/or operations may be used to implement the principles disclosed herein. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A modulation monitoring system for use with an imaging system that images a workpiece surface and that includes a high speed periodically modulated variable focal length (VFL) lens, wherein:

the imaging system comprises:
   an imaging light source that is not the workpiece surface and that is configured to provide source light along a source light path to illuminate the workpiece surface, wherein the source light travels from the imaging light source to the workpiece surface and the source light is at least one of reflected or transmitted by the workpiece surface as image light;
   an objective lens configured to input the image light arising from the workpiece surface, the VFL lens configured to receive image light transmitted by the objective lens along an imaging optical path, and a camera configured to receive light transmitted by the VFL lens along the imaging optical path;
   a VFL lens controller configured to control the VFL lens to periodically modulate its optical power at high speed and thereby periodically modulate a focus position of the imaging system over a plurality of imaging system focus Z heights along a Z-height direction, and the modulation monitoring system comprises:
   a VFL-traversing light source, comprising a light source configured to provide VFL-traversing light along a modulation monitoring light path through the VFL lens, wherein the VFL-traversing light source comprises a different light source than the imaging light source and the modulation monitoring light path does not include the workpiece surface; and
   a modulation signal determining portion comprising an optical detector configured to receive the VFL-traversing light, wherein the VFL-traversing light travels from the VFL-traversing light source through the VFL lens and to the optical detector but does not travel to or from the workpiece surface that is imaged by the imaging system, and the optical detector is configured to provide at least one optical detector signal that corresponds to the modulated optical power of the VFL lens, and the modulation monitoring system outputs at least one modulation monitoring signal based on the at least one optical detector signal.

2. The modulation monitoring system of claim 1, wherein the VFL-traversing light source is arranged to provide the VFL-traversing light along a modulation monitoring light path which inputs the VFL-traversing light at one of a) a front portion of the VFL lens which is closer to the objective lens, or b) a back portion of the VFL lens which is farther from the objective lens; and the optical detector is arranged to receive the VFL-traversing light along the modulation monitoring light path after it is output from the VFL lens at the other of a) the front portion, or b) the back portion.

3. The modulation monitoring system of claim 2, wherein the VFL-traversing light source is arranged to provide the VFL-traversing light along a modulation monitoring light path which inputs the VFL-traversing light at a).

4. The modulation monitoring system of claim 2, wherein the VFL-traversing light source is arranged to provide the VFL-traversing light along a modulation monitoring light path which inputs the VFL-traversing light at b).

5. The modulation monitoring system of claim 1, wherein:
the VFL-traversing light source is arranged to provide the VFL-traversing light along a modulation monitoring light path which inputs the VFL-traversing light at a first one of a) a front portion of the VFL lens which is closer to the objective lens, or b) a back portion of the VFL lens which is farther from the objective lens;
a wavelength dependent reflector is arranged to reflect the VFL-traversing light back along the modulation monitoring light path after it is output from the VFL lens at the other one of a) the front portion, or b) the back portion; and
the optical detector is arranged to receive the reflected VFL-traversing light along the modulation monitoring light path after it is output from the VFL lens at the first one of a) or b).

6. The modulation monitoring system of claim 5, wherein:
the VFL-traversing light source is arranged to provide the VFL-traversing light along the modulation monitoring light path which inputs the VFL-traversing light at a);
the wavelength dependent reflector is arranged to reflect the VFL-traversing light back along the modulation monitoring light path after it is output from the VFL lens at b); and
the optical detector is arranged to receive the reflected VFL-traversing light along the modulation monitoring light path after it is output from the VFL lens at a).

7. The modulation monitoring system of claim 5, wherein:
the VFL-traversing light source is arranged to provide the VFL-traversing light along the modulation monitoring light path which inputs the VFL-traversing light at b);
the wavelength dependent reflector is arranged to reflect the VFL-traversing light back along the modulation monitoring light path after it is output from the VFL lens at a) the front portion; and
the optical detector is arranged to receive the reflected VFL-traversing light along the modulation monitoring light path after it is output from the VFL lens at b).

8. The modulation monitoring system of claim 5, wherein the wavelength dependent reflector is a narrow band reflector.

9. The modulation monitoring system of claim 5, wherein the wavelength dependent reflector is a dichroic reflector.

10. The modulation monitoring system of claim 1, wherein the VFL-traversing light has a wavelength which is at least 700 nm.

11. The modulation monitoring system of claim 1, wherein the optical detector comprises a Shack-Hartmann sensor.

12. The modulation monitoring system of claim 11, wherein the optical detector comprises at least one quad cell photodiode sensor.

13. The modulation monitoring system of claim 11, wherein the optical detector comprises discrete photodetectors.

14. The modulation monitoring system of claim 11, wherein the optical detector comprises at least one position sensitive detector.

15. The modulation monitoring system of claim 1, wherein the VFL lens is a tunable acoustic gradient index of refraction lens.

16. The modulation monitoring system of claim 1, wherein the modulation monitoring system is configured to provide feedback to the VFL lens controller to compensate for changes in at least one of optical power or frequency of the VFL lens.

17. The modulation monitoring system of claim 1, wherein the modulation monitoring light path passes through the VFL lens outside of the portion of the VFL lens that is used for imaging.

18. A method for operating a modulation monitoring system for use with an imaging system that images a workpiece surface and that includes a high speed periodically modulated variable focal length (VFL) lens, wherein:
the imaging system comprises:
an imaging light source that is not the workpiece surface and that is configured to provide source light along a source light path to illuminate the workpiece surface, wherein the source light travels from the imaging light source to the workpiece surface and the source light is at least one of reflected or transmitted by the workpiece surface as image light;
an objective lens configured to input the image light arising from the workpiece surface, the VFL lens configured to receive image light transmitted by the objective lens along an imaging optical path, and a camera configured to receive light transmitted by the VFL lens along the imaging optical path;
a VFL lens controller configured to control the VFL lens to periodically modulate its optical power at high speed and thereby periodically modulate a focus position of the imaging system over a plurality of imaging system focus Z heights along a Z-height direction, and
the modulation monitoring system comprises:
a VFL-traversing light source, comprising a light source configured to provide VFL-traversing light along a modulation monitoring light path through the VFL lens, wherein the VFL-traversing light source comprises a different light source than the imaging light source and the modulation monitoring light path does not include the workpiece surface; and
a modulation signal determining portion comprising an optical detector;
wherein the method comprises:
operating the VFL-traversing light source to provide the VFL-traversing light along the modulation monitoring light path through the VFL lens and for which the optical detector receives the VFL-traversing light and the modulation monitoring light path does not include the workpiece surface, wherein the VFL-traversing light travels from the VFL-traversing light source through the VFL lens and to the optical detector but does not travel to or from the workpiece surface that is imaged by the imaging system;

receiving from the optical detector at least one optical detector signal that corresponds to the modulated optical power of the VFL lens; and providing at least one modulation monitoring signal based on the at least one optical detector signal.

19. The method of claim 18, wherein the VFL lens is a tunable acoustic gradient index of refraction lens.

20. The method of claim 18, further comprising providing feedback to the VFL lens controller to compensate for changes in at least one of optical power or frequency of the VFL lens.

* * * * *